(12) United States Patent
Koehler et al.

(10) Patent No.: US 9,333,481 B2
(45) Date of Patent: May 10, 2016

(54) DEPTH FILTER LAYER WITH INORGANIC LAYER DOUBLE HYDROXIDE

(75) Inventors: Katrin Koehler, Goettingen (DE); Axel Thiefes, Hardegsen (DE); Klaus Tarrach, Helsingborg (SE)

(73) Assignee: SARTORIUS STEDIM BIOTECH GMBH, Goettingen (DE)

( * ) Notice: Subject to any disclaimer, the term of this patent is extended or adjusted under 35 U.S.C. 154(b) by 945 days.

(21) Appl. No.: 13/058,843

(22) PCT Filed: Aug. 11, 2009

(86) PCT No.: PCT/EP2009/005825
§ 371 (c)(1),
(2), (4) Date: Apr. 29, 2011

(87) PCT Pub. No.: WO2010/017964
PCT Pub. Date: Feb. 18, 2010

(65) Prior Publication Data
US 2011/0207196 A1 Aug. 25, 2011

(30) Foreign Application Priority Data

Aug. 14, 2008 (DE) .......................... 10 2008 037 678

(51) Int. Cl.
| | |
|---|---|
| *B01D 37/02* | (2006.01) |
| *B01J 20/14* | (2006.01) |
| *B01J 20/08* | (2006.01) |
| *B01J 20/10* | (2006.01) |
| *B01J 20/24* | (2006.01) |

(Continued)

(52) U.S. Cl.
CPC ................ *B01J 20/08* (2013.01); *B01J 20/103* (2013.01); *B01J 20/24* (2013.01); *B01J 20/26* (2013.01); *B01J 20/262* (2013.01); *B01J 20/28057* (2013.01); *B01J 2220/46* (2013.01); *B01J 2220/4825* (2013.01)

(58) Field of Classification Search
USPC ........ 210/500.1, 767, 791; 427/244; 435/183; 530/344, 387.1, 427
See application file for complete search history.

(56) References Cited

U.S. PATENT DOCUMENTS 4,282,261 A * 8/1981 Greene ...................... 426/330.4
4,859,340 A 8/1989 Hou et al.
(Continued)

FOREIGN PATENT DOCUMENTS

| CN | 1048892 A | 1/1991 |
|---|---|---|
| DE | 29520817 U1 | 7/1996 |

(Continued)

OTHER PUBLICATIONS

English-language Translation of International Preliminary Report on Patentability and Written Opinion—International Application No. PCT/EP2009/005825, dated Feb. 24, 2011.

(Continued)

*Primary Examiner* — Dirk Bass
(74) *Attorney, Agent, or Firm* — McDermott Will & Emery LLP

(57) ABSTRACT

The present invention relates to a depth filter layer with inorganic layer double hydroxide, a method for production thereof, a filtration device containing this, a method for the separation of at least one contaminant from at least one target product in a liquid medium by means of at least one upstream depth filter layer and the use of the depth filter layer for removal of contaminants. The depth filter layer selectively retains contaminants such as nucleic acids, while target proteins of biotechnological processes are transmissible into the filtrate.

28 Claims, 6 Drawing Sheets

(51) Int. Cl.
*B01J 20/26* (2006.01)
*B01J 20/28* (2006.01)

(56) References Cited

U.S. PATENT DOCUMENTS

2005/0257909 A1* 11/2005 Lindgren et al. ........... 162/181.2
2006/0032814 A1 2/2006 Haberkamp et al.
2010/0100027 A1* 4/2010 Schilthuizen et al. ....... 604/6.09

FOREIGN PATENT DOCUMENTS

| DE | 10044218 A1 | 4/2002 |
| GB | 1483088 A | 8/1977 |
| JP | 2003-047647 A | 2/2003 |
| JP | 2006-026566 A | 2/2006 |
| WO | WO-2005/014160 A1 | 2/2005 |
| WO | 2006/127652 A | 11/2006 |
| WO | WO-2008/075951 | 6/2008 |

OTHER PUBLICATIONS

Written Opinion—International Application No. PCT/EP2009/005825—European Patent Office—Nov. 5, 2009.
International Search Report—International Application No. PCT/EP2009/005825—European Patent Office—Nov. 5, 2009.

* cited by examiner

DEPTH FILTER LAYER WITH INORGANIC LAYER DOUBLE HYDROXIDE

The present invention relates to a depth filter layer with inorganic layer double hydroxide, a method for production thereof, a filtration device containing this, a method for the separation of at least one contaminant from at least one target product in a liquid medium by means of at least one upstream depth filter layer and the use of the depth filter layer for removal of contaminants. In this, for the separation of undesired biological components from process solutions a liquid medium which contains these biological components and a desired target product is brought into contact with the depth filter layer according to the invention, whereby at least one undesired biological component is adsorptively bound to the depth filter and is thus removed from the process solution. Accordingly, the desired target product, such as for example therapeutic proteins, should be able to pass through the depth filter unimpeded and in active form. The undesired biological components include in particular biological contaminants, such as for example nucleic acids, cell proteins, viruses or endotoxins from process solutions. Examples of therapeutic proteins are antibodies, hormones, enzymes or peptides.

A large number of therapeutic, recombinant proteins are based on cell culture processes, which are carried out on small and large, industrial scales in bioreactors or fermenters. The cell culture solution contains the desired target protein among a large number of other components such as intact cells, cell fragments and smaller cell components, which must be separated from the target protein in a costly process consisting of many component steps ("downstream process"). Depth filtration plays a major part in the separation of cells, cell fragments and colloidal components.

Depth filters based on cellulose fibres are inter alia described in the following patents:

U.S. Pat. No. 5,232,595 describes depth filters consisting of fibre materials such as cellulose, polyolefins, glass or ceramics in combination with kieselguhr or perlites.

U.S. Pat. No. 4,676,904 describes depth filter layers consisting of neutral and positively charged cellulose fibres in combination with kieselguhr or perlites.

U.S. Pat. No. 4,007,114 describes particle-free filter media consisting of cellulose and glass fibres and a positively charged melamine-formaldehyde resin for the separation of electronegative particles of size 0.1-0.7 μm. The addition of kieselguhr to this filter system is described in U.S. Pat. No. 4,007,113 and U.S. Pat. No. 4,321,288.

U.S. Pat. No. 4,305,782 describes a filter system with a positive zeta potential consisting of cellulose fibres and an $SiO_2/Al_2O_3$ composite with no wet strength agent. A method for the removal of contaminants of sizes in the submicrometer range from biological solutions with the filter systems disclosed in U.S. Pat. No. 4,305,782 is described in U.S. Pat. No. 4,366,068.

The introduction of a combination of non-milled and milled cellulose fibres into a filter system together with 50 weight percent of a powder such as kieselguhr/perlite and a positively charged melamine-formaldehyde resin is described in U.S. Pat. No. 4,309,247.

U.S. Pat. No. 4,282,261 describes a method for the removal of suspended matter from unstable drinks by means of a filter system consisting of cellulose fibres, kieselguhr and a polyamide/polyamine-epichlorohydrin resin.

U.S. Pat. No. 4,859,340 describes a depth filter layer consisting of at least 50 weight percent of an $SiO_2$-containing powder such as kieselguhr, cellulose fibres and 1-3 weight percent of a polyamide/polyamine-epichlorohydrin resin, wherein the depth filter layer displays increased binding capacities to electronegative particulate contaminants from liquids.

The introduction of primary and secondary charge carriers into depth filter elements containing cellulose fibres and kieselguhr is described in U.S. Pat. No. 4,981,591. A polyamide/polyamine-epichlorohydrin resin is adsorbed onto the surface of the depth filter elements as a primary charge modification agent, and subsequently aliphatic polyamines with primary and secondary amine functions are bound to epoxy groups of the primary charge modification agent as a secondary charge modification agent. The process for the removal of anionic contaminants from aqueous solutions with these filter layers disclosed in U.S. Pat. No. 4,981,591 is described in U.S. Pat. No. 5,085,780.

The depth filter layers used according to the state of the art are on the one hand used for the separation of particles larger than the pore size of the filter (sieve effect) and on the other particles smaller than the pore size of the filter are retained by the depth filter by adsorptive interactions. By now, cellulose-based depth filter layers in particular are already finding a use for the purification of cell culture solutions. In the last 10 years, the cell densities in cell culture processes have risen from ca. $10^5$ cells/ml to well over $10^7$ cells/ml. Associated with this are markedly reduced cell vitalities, which with the comprehensive cell lysis have led to a very markedly increased concentration of cell proteins and DNA. Modern cell culture processes show cell densities of over $10^7$ cells per ml and vitalities of less than 50%, which can lead to DNA concentrations of up to $10^6$ ppm (1 g/l) (Tarrach et al., Pharmaceutical Technology Europe, 01. April 2008, 71-77). This is the fundamental reason for the increasing requirements for special depth filters with regard to the separation of the undesired components such as cells, cell fragments, colloidal components, cell proteins, DNA etc. At the same time, it must be ensured that the cost-intensive therapeutic target protein can pass through the depth filter unimpeded and in active form. Thus there is a constant demand for improved depth filter layers in terms of higher capacities and/or higher contaminant removal with sufficiently high transmission of the target protein.

Depletion of the cell culture DNA is expressly required by the authorities, since it represents a risk to the patient in terms of human pathogenesis. Guidelines are "Points to Consider in the Manufacturing and Testing of Monoclonal Antibody Products for Human Use" (FDA CBER; Feb. 28, 1997) and "Requirements for Biological Substances No. 50. Requirements for the Use of Animal Cells as in vitro Substrates for the Production of Biologicals" (WHO Technical Report Series No. 878, 1998). With regard to process technology, high DNA concentrations are a problem since according to the guidelines the purification process downstream of the bioreactor/fermenter must remove this DNA down to a content below the detection limit. As a rule chromatographic processes (Protein A in the "capture step" and anion exchange chromatography in flow mode) are used for DNA depletion. However, with initial DNA concentrations of greater than $10^6$ ppm, adequate DNA depletion by these processes is impracticable in terms of process technology and economy (K. Tarrach, "Process Economy of Disposable Chromatography in Antibody Manufacturing", WIBio's BioProcess Technology 4th Annual Conference (Amsterdam, The Netherlands, April 2007)).

Hence, in order to free the downstream processes from high DNA and contaminant concentrations, additional steps or improved technologies are necessary in the initial workup steps, since chromatographic methods at this point fail on account of the high conductivity profile (J. Nolan, EMD Pharmaceuticals, Downstream Technology Forum, Boston, Mass., Oct. 9, 2007).

Such a possibility is in principle offered by the use of a larger depth filter area or a larger filter volume, and multilayer depth filters in particular are found to be effective here, since through the use of a larger filter layer height (2 filter layers laid one above the other) and owing to the higher residence time associated therewith and the greater binding capacity, larger quantities of DNA can be depleted than with single-layer depth filters.

From the literature, only a few studies on DNA depletion by depth filters are so far known (Review in: Yigzaw et al., Biotechnol. Prog. 2008, 22, 288-296; "Exploitation of the Adsorptive Properties of Depth Filters for Host Cell Protein Removal during Monoclonal Antibody Purification"). These show that the DNA binding takes place via both hydrophobic and charge-dependent mechanisms. In this, a positive surface charge of the filter is of most importance, and is attained by use of a positively charged binder. The influence of the binder content on the DNA retention was studied by Eschrich et al. and shows that the DNA retention can only be increased to a limited extent via the binder content (BioPharm, January 1997, 46-49). Moreover, this method has the considerable disadvantage that with increasing binder content in the depth filter, the content of extractable components in the process also increases.

Thus depth filters which are capable of increased DNA depletion without a simultaneous increase in the extractable components represent a desirable improvement. At the same time, with increasing DNA depletion there must be no increasing depletion of the target product, such as for example therapeutic proteins. In this connection it is important to emphasize that DNA-depleting depth filter layers should be endowed with physicochemical stability that allows their use before or after the chromatographic process in the downstream process. At the same time, the binding capacity of the DNA-depleting depth filter layer should lie within the conductivity profile of cell culture supernatants, in order to enable reliable depletion of the contaminants described. Use of such depth filter layers at the start of the process after the first purification steps to ease the burden on downstream, more cost-intensive purification steps is possible and necessary.

In Angew. Chem. 2000, 112, 4207-4211, soluble layer double hydroxides (LDH) as an inorganic, non-cytotoxic vector in the form of DNA-LDH hybrids are reported. Here, negatively charged DNA fragments are intercalated via ion exchange processes into the interlayer spaces of the positively charged, brucite-like layers of the layer double hydroxide. Through this incorporation, the degradation of DNA is prevented and the transport of the DNA-LDH hybrids into mammalian cells by endocytosis is enabled. In the cytoplasm of the cell, the DNA is then liberated for further processes.

In DE 102 37 517 A1 and DE 102 37 518 A1, enrichment or depletion of biomolecules by means of layer double hydroxides in powder form such as calcined hydrotalcite is described. The porous layer double hydroxides function as sorbents which are bound with binders such as inter alia alginate, chitosan, pectin and calcium carbonate into particle aggregates or shaped bodies or deposited onto a carrier such as calcium carbonate. Thereby, high binding capacities both between the calcined hydrotalcites and DNA and also between the calcined hydrotalcites and the desired target proteins are attained. Average particle sizes (D50) of the hydrotalcite of more than 1 µm are found to be particularly advantageous for use as sorbents. According to DE 102 37 517 A1 and DE 102 37 518 A1, a selective DNA separation from target proteins is not attained with this sorbent.

JP 2006-026566 A describes a film-like material, consisting of particles of organic polymers, hydrotalcite and filter material based on paper or plastic films, for the adsorption of gases, for deodorizing in the domestic sector, for keeping foods fresh and as insect repellents. JP 2003-047647 A describes a deodorizing composition of hydrotalcite, metal oxides, (meth)acrylic acid derivatives and organopolysiloxanes. WO 2005/014160 A1 describes a porous material based on cellulose- or lignin-containing paper and inorganic layer double hydroxides. DE 295 20 817 U1 describes a paper produced from cellulose fibres and a wet strength agent. DE 100 44 218 A1 describes wet strength-treated depth filters, the cellulose fibres whereof are treated with a hydrophilic polyisocyanate.

In the state of the art, nothing is known concerning a selective and sufficiently high depletion of undesired biomolecules such as DNA with simultaneous non-binding of target proteins by means of hydrotalcite or by means of depth filter layers.

The purpose of the invention is to provide stable and inexpensive depth filter layers on the small and large, industrial scale, which enable particularly high and rapid depletion of undesired biological contaminants, such as for example nucleic acids from liquid media, while at the same time the desired target products, such as for example therapeutic proteins, can pass through the depth filter unimpeded and in active form. Further, an application of the depth filter layers according to the invention, a method for the separation of biological contaminants from process solutions and a filtration device containing the depth filter layers according to the invention should be proposed.

This problem is solved by the provision of a depth filter layer according to Claim 1, a process for the production of the depth filter layer according to Claim 18, by the use of the depth filter layer according to the invention according to Claim 32, by the provision of a process for the separation of target products from contaminants according to Claim 27 and by the provision of a filtration device according to Claim 26, containing the depth filter layer according to Claim 1.

Target products should be understood to mean all products which are to be obtained by the upstream production process. These include biomolecules such as proteins, peptides, polypeptides or hormones. In particular target products are understood to mean therapeutic proteins.

Here, nucleic acids should be understood to mean all naturally occurring nucleic acids such as ribonucleic acid (RNA) and desoxyribonucleic acid (DNA), in particular DNA of genomic but also epigenomic origin from eukaryotic, prokaryotic and viral sources, and quite particularly nucleic acids with a chain length of more than 15 base pairs.

Contaminants should be understood to mean all substances which are different from the target molecule and are contained in the process solution, in particular whole cells and cell aggregates, cell fragments, colloidal components and macromolecular biomolecules, and in the case of the latter in particular those biomolecules which are selected from the group of the nucleic acids, host cell proteins, lipopolysaccharides, lipids, saccharides, etc. The term process solutions includes those solutions in which the target molecule is produced by biological producers (fermentation approach), in particular biological producers from the group of the eukaryotic and prokaryotic organisms and cells. In addition it includes those solutions which are derived from a fermentation liquor, in particular those solutions which are produced by separation processes such as centrifugation, prefiltration, osmotic processes or dilution or the introduction of chemicals etc.

Surprisingly it was found according to the present invention, that depth filter layers containing inorganic layer double hydroxides, in particular hydrotalcite, selectively bind biological components, in that particularly high depletion of undesired biological contaminants such as DNA takes place, while desired target proteins can pass through the depth filter unimpeded. Depth filters of the state of the art deplete only insignificant quantities of DNA and target proteins pass largely unimpeded through the depth filters. Hydrotalcite powders of the state of the art, which are not processed into in depth filter layers, both desirably deplete DNA and also undesirably deplete target proteins.

Compared to the state of the art, with the depth filter layers according to the invention up to 10 times as high depletions of DNA are achieved (compare following Table 3, "50% DBT", e.g. DF4 versus DF7), without the desired target protein being bound onto the depth filter. This behaviour is surprising, since for example hydrotalcite as a powder has no selectivity; both biological contaminants such as DNA and also desired target proteins are bound to a large extent, which makes use of the powder per se for the purification of cell culture solutions impossible. Only by the processing according to the invention for example of the hydrotalcite powder into depth filter layers with cellulose fibres, optionally kieselguhr, and positively charged wet strength agents is this high selectivity with regard to the biological components to be separated from process solutions attained. Evidently this surprising and advantageous behaviour is based on an interaction between the hydrotalcite and the complex structure of the charged wet strength agent.

Here according to the invention wet strength agents should be understood to mean all water-soluble synthetic resins which are added to the aqueous suspension in the production process of the depth filter in order to increase the tensile, folding, bursting and abrasion strength of the depth filter in the wet state. Here, polymeric or polyfunctional compounds with reactive groups, which only react with carboxyl and/or OH groups of the cellulose and the inorganic powder under the drying conditions and thereby bridge the filter components to one another are used. The most important groups of wet strength agents are epichlorohydrin resins, melamine-formaldehyde resins (MF), urea formaldehyde resins (UF), glyoxal-polyacrylamide resins and also isocyanate resins. Positively charged wet strength agents preferably include polyamine-epichlorohydrin resins, polyamide-epichlorohydrin resins and polyamide-polyamine-epichlorohydrin resins such as for example Kymene®, Nadavin® or Polycup®, in which as reactive groups cationic azetidinium groups with ring-strained four-membered ring structure are capable of homo- and co-crosslinking. With the depth filter layers according to the invention, containing for example hydrotalcite, for the first time depth filter layers can be provided which in addition to the conventional cell and cell fragment separation and removal of colloidal components also at the same time remove large quantities of DNA from cell culture solutions. Hence the, for example hydrotalcite-containing, depth filter layers according to the invention yield filtrates of improved quality in terms of decreased contaminant concentrations, which advantageously leads to a simplification of the subsequent and sometimes costly purification steps in the "downstream process", i.e. in the downstream, multistage process for the workup of the target molecule. The physico-chemical stability of the depth filter layers according to the invention thus enables the use of the depth filters for the filtration of cell culture solutions both before the chromatography steps and also after the chromatography steps in the downstream process. Thereby, high DNA binding capacities in the conductivity profile of the cell culture supernatants are attained.

As already in part described above, the depth filter layer according to the invention is produced from cellulose fibres and/or derivatives thereof, at least one inorganic layer double hydroxide and at least one organic wet strength agent.

According to the present invention, cellulose fibres and/or derivatives thereof which were originally obtained from wood (hard or soft wood) or cotton are used. Preferably, cellulose fibres from wood and particularly preferably from soft wood are used. Mixtures of cellulose fibres of different length (long and short-fibre celluloses) and pure short- or pure long-fibre celluloses can be used, wherein the fibre lengths lie between 0.1 mm and 7 mm and the fibre widths between 5 µm and 30 µm, preferably between 10 µm and 30 µm. In the filter, the cellulose forms a three-dimensional network, which ensures high mechanical stability and high flow rates. In the cavities of the three-dimensional network, as well as the inorganic powders, short-fibre cellulose, which also functions as a filler and contributes to the smoothing of the filter surface, is present. In a preferred embodiment, exclusively short-fibre cellulose is used as the cellulose fibre. Derivatives of the cellulose fibres can also be used, water-soluble carboxyalkylcelluloses being preferred. Carboxymethylcellulose (CMC) is particularly preferred among the water-soluble carboxyalkylcelluloses. The proportion of CMC by weight in the mixtures used for the production of the depth filter layers according to the invention is between 0.1 and 10%, preferably between 0.3 and 2.0%, more preferably between 0.4 and 1.5% and most preferably between 0.5 and 1.0%. CMC in combination with epichlorohydrin resins leads to improved dry and wet strength. Further, as derivatives of cellulose, cationically modified celluloses can be used, such as for example cellulose functionalized with ammonium ion-bearing groups, preferably trimethylammoniumpropylcellulose chloride and 2-hydroxy-trimethylammoniumpropylcellulose chloride or functionalized with amino groups, preferably alkylamines.

The inorganic layer double hydroxides of the depth filter layers according to the invention are preferably selected from the group of the natural and synthetic hydrotalcite and hydrotalcite-like compounds, as described by F. Cavani et al. in Catalysis Today 1991, 11(2), 173-301. In this connection, reference may in particular be made to pages 176 to 191, the disclosure content whereof is included herein by reference. Hydrotalcite has a cationic layer structure with exchangeable anions in the interlayer spaces. According to the invention, for the aforesaid natural and synthetic hydrotalcite and hydrotalcite-like compounds the following formulae can for example be given for illustration:

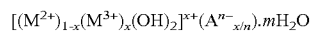

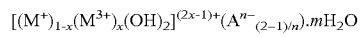

Herein, x can take values from 0 to 1, preferably $0.1 \leq x \leq 0.5$ and more preferably $0.2 \leq x \leq 0.33$ n can take values from 1 to 4, and m varies depending on the water of crystallization content and is a rational number including 0. The maximum possible quantity of water of crystallization in appropriate compounds is determinable by various approaches, which are described in the above source on pages 189 and 190. Furthermore, for the aforesaid natural and synthetic hydrotalcite and hydrotalcite-like compounds for example compounds which contain both $M^+$ and also $M^{2+}$ can also be stated. For these cases, reference may likewise be made to the above source.

According to the invention, hydrotalcite $Mg_6Al_2(CO_3)(OH)_{16}.4 H_2O$ is preferably used as the natural or synthetic, non-calcined product. In general, the layer double hydroxides used consist of the mono-, di- and trivalent metal cations $M^+$, $M^{2+}$ and $M^{3+}$, the hydroxide anions $OH^-$ and a further mono- to tetravalent anion $A^{n-}$ (n=1, 2, 3, 4) and if necessary water of crystallization. Here $M^+$ is a monovalent alkali metal ion such as for example $Li^+$ or $Na^+$, $M^{2+}$ a divalent alkaline earth or transition metal ion such as for example $Mg^{2+}$, $Sr^{2+}$, $Ba^{2+}$, $Ni^{2+}$, $Cu^{2+}$, $Co^{2+}$, $Zn^{2+}$, $Fe^{2+}$, $Mn^{2+}$, or $Ca^{2+}$, $M^{3+}$ a trivalent main group or transition metal ion such as for example $B^{3+}$, $Al^{3+}$, $Ga^{3+}$, $Ni^{3+}$, $Co^{3+}$, $Cr^{3+}$, $Fe^{3+}$, $Mn^{3+}$, $V^{3+}$, $Ti^{3+}$, $Sc^{3+}$ or $In^{3+}$; $A^{n-}$ an anion such as for example $F^-$, $Cl^-$, $Br^-$, $I^-$, $OH^-$, $NO_3^-$, $ClO_4^-$, $ClO_3^-$, $IO_3^-$, $CO_3^{2-}$, $SO_4^{2-}$, $PO_4^{3-}$, $AsO_4^{3-}$, $S_2O_3^{2-}$, $WO_4^{2-}$, $CrO_4^{2-}$, $[Fe(CN)_6]^{3-}$, $[Fe(CN)_6]^{4-}$, $[SiO(OH)_3]^-$, hetero polyacids, organic acids or organometallic complexes. Examples of hetero polyacids here are $(PMo_{12}O_{40})^{3-}$ and $(PW_{12}O_{40})^{3-}$, examples of organic acids are adipic, oxalic, succinic, malonic, sebacic, 1,12-dodecanedicarboxylic acid, acyl- and arylsulphonates, and chlorocinnamic acid, and an example of an organometallic complex is $[Ru(4,7-diphenyl-1,10-phenanthrolinedisulphonate)_3]^{4-}$. The mole ratio of $M^{2+}$ to $M^{3+}$ here is a maximum of 2.5:1, preferably a maximum of 2.3:1 and particularly preferably a maximum of 2.1:1. The weight ratio of $M^{2+}$ to $M^{3+}$, calculated as weight ratio of the oxides MO to $M_2O_3$, is a maximum of 2.2:1, preferably a maximum of 2.0:1 and particularly preferably a maximum of 1.85:1. Most preferably, synthetic, non-calcined hydrotalcite consisting of magnesium and aluminium cations and carbonate as anion is used. In the practical examples, the aluminium magnesium hydroxycarbonate Syntal® 696 from Südchemie AG is used, wherein the weight ratio of the oxides MgO to $Al_2O_3$ equals 1.625. The diameter of the inorganic layer double hydroxide particles is between 0.1 μm and 500 μm, preferably between 0.3 and 300 μm and particularly preferably between 0.5 and 100 μm. The hydrotalcites used have Brunauer-Emmet-Teller (BET) surface areas of more than 15 $m^2/g$, preferably more than 25 $m^2/g$ and particularly preferably more than 35 $m^2/g$. In the special practical examples, hydrotalcite powders with a BET surface area of 50 $m^2/g$ or 54 $m^2/g$ are used. The BET surface areas here are determined as stated below.

The depth filter layers according to the invention can contain as the inorganic powder only inorganic layer materials and also a mixture of inorganic layer materials and particles based on $SiO_2$ and/or at least one derivative thereof. As particles based on $SiO_2$, porous kieselguhr and/or synthetic silica gel, optionally in combination with perlites, are preferably used. Particularly preferably, diatomaceous earths are used, optionally in combination with perlites, most preferably natural diatomaceous earths. Natural diatomaceous earths are not calcined. Derivatives of the particles based on $SiO_2$ include all anion exchange materials based on $SiO_2$, such as for example $SiO_2$ functionalized with organic groups, which contain quaternary ammonium ions, particularly preferably $SiO_2$ functionalized with trimethylammoniumpropyl chloride. The average particle size diameters of the particles based on $SiO_2$ lie between 0.5 μm and 100 μm, preferably between 2 μm and 40 μm, quite preferably between 4 μm and 20 μm. In the practical examples, kieselguhrs with an average particle size diameter of 8 μm are used.

Preferably only hydrotalcite or a mixture of hydrotalcite and kieselguhr is used as the inorganic powder. Particularly preferable here is only hydrotalcite or a mixture of hydrotalcite and kieselguhr in which the content by weight of hydrotalcite is greater than that of kieselguhr. In the practical example for the depth filter 7 (HT900) according to the invention, only hydrotalcite is used, and in the further practical examples the content by weight of hydrotalcite is preferably at least 1.7 times as high, particularly preferably at least twice as high, as that of kieselguhr.

The content by weight of the inorganic powders based on the other components used lies between 10% and 75% and preferably between 20% and 70%, and particularly preferably is 30% to 65%. The higher the content of hydrotalcite in the depth filter layers, the higher the DNA binding capacities of the depth filters according to the invention are.

As wet strength agents, according to the invention water-soluble resins from the group epichlorohydrin resins, melamine-formaldehyde resins, urea formaldehyde resins, glyoxal-polyacrylamide resins, isocyanate resins and mixtures thereof are used. Preferred are positively charged epichlorohydrin resins, and particularly preferred are polyamide/polyamine-epichlorohydrin resins, polyamine-epichlorohydrin resins and polyamide-epichlorohydrin resins, such as for example Kymene®, Nadavin® or Polycup®. In the practical examples, Kymene® from Hercules is used as the wet strength agent. On contacting the resin with the other components of the depth filter layers according to the invention in the production process, polymer bridges arise between the reactive azetidinium groups or other epichlorohydrin-based groups of the wet strength agent and the carboxyl and/or hydroxy groups of the cellulose fibres and the inorganic powder (consisting of inorganic layer double hydroxides and optionally of particles based on $SiO_2$ such as natural diatomaceous earth or synthetic silica gel), whereas it is mainly only in the later drying process of the filter production that chemical crosslinking with the formation of covalent bonds, such as for example ester bonds, and of non-covalent bonds, occurs. Only through this reaction does the depth filter retain its wet strength in the use process with maintenance of the positive charge. The content by weight of the wet strength agent based on the other filter components added lies between 0.5% and 10%, preferably between 1% and 5%. In the practical examples 2% of wet strength agent is used.

According to a preferred embodiment, the present invention provides a depth filter produced from
cellulose fibres and/or derivatives thereof,
at least one inorganic layer double hydroxide and
at least one organic wet strength agent,
wherein the depth filter layer is produced from a mixture in which the content by weight of the at least one inorganic layer double hydroxide is 10-65%, the content by weight of the cellulose fibres and/or derivatives thereof 30-80% and the content by weight of the organic wet strength agent 0.5-10% and the contents by weight add up to 100%.

The production of the depth filter layers according to the invention is preferably effected by the following process, comprising the steps:
(1) preparation of cellulose fibres and/or derivatives thereof in at least one liquid medium,
(2) addition of at least one inorganic layer double hydroxide,
(3) addition of at least one organic wet strength agent to the mixture obtained in step (2),
(4) application of the suspension obtained in step (3) onto a carrier,
(5) removal of the at least one liquid medium and
(6) drying of the depth filter layer obtained in step (5).

According to a preferred embodiment, the cellulose fibres are added to water and milled to the desired fineness with a milling machine. The degree of milling of the cellulose fibres as well as the particle size of the inorganic powder used and the powder content in the filter predominantly determines the filtration resolution of the depth filter. The milling of the cellulose fibres can also be effected after addition of the inorganic layer double hydroxide, i.e. after step (2), or after addition of the wet strength agent, i.e. after step (3).

Herein, filtration resolution should be understood to mean a separation of components of different sizes from solutions. The depth filtration can also be effective for those particles which are smaller than the pore size of the filter layer. Therefore with depth filters the filtration effect is not stated by giving the pore diameter as in the case of membranes which are based on absolute retention rates.

Here the characterization of the filtration resolution is rather made by statement of the water permeability under defined conditions.

After addition of the inorganic powder, the total solids content of an aqueous suspension of cellulose fibres and inorganic powders is ca. 4%. The addition of the wet strength agent can be effected according to the invention before or after the addition of the inorganic powder. The suspension obtained is for example applied onto a sieving vessel, for example water is removed by application of a surface vacuum, during which according to a preferred embodiment at the same time the concentrated suspension is homogenized by overtravelling rollers and the resulting filter surface is smoothed. The wet depth filter layer is preferably compressed to the desired filter thickness by means of a roller and preferably dried at ca. 100-250° C. in a drying oven with variably adjustable temperature zones. During this, the drying can be effected with a rising temperature profile or at a constant temperature. Preferably a temperature profile is run, quite preferably a temperature profile with different temperature zones. Preferably the thickness of the depth filter layers according to the invention lies between 1 and 8 mm, particularly preferably between 2 and 6 mm. In the practical examples the thickness lies between 3.0 mm and 4.5 mm. The water flow as a measure of the filtration resolution of the depth filters according to the invention is obtained by measurement of the time, stated in the unit [5], which a depth filter according to the invention of 47 mm diameter size requires for 100 ml of distilled water at 1 bar differential pressure. The water flow is often also stated as water flow rate with the unit [liter/($m^2_{Filter}$·minute)]. Depth filter layers according to the invention with water flow rates of 20 to 2000 l/($m^2$ min) at a thickness of ca. 4 mm are preferable.

According to a further preferred embodiment of the present invention, silicon dioxide and/or at least one derivative thereof can be added as further components before the aforesaid step (4). Alternatively, according to the present invention, silicon dioxide and/or at least one derivative thereof can be added in step (2) together with the at least one inorganic layer double hydroxide.

According to a further preferred embodiment of the present invention, kieselguhr and/or perlite are added as further components before the aforesaid step (4). Alternatively, according to the present invention, kieselguhr and/or perlite can be added in step (2) together with the at least one inorganic layer double hydroxide.

The depth filter layers according to the invention are used in filtration processes for the removal of particulate, colloidal and dissolved components from liquid media. The components to be separated here are preferably undesired biological contaminants. Particularly preferably, the components to be separated comprise contaminants from cell culture solutions, such as for example cells, cell fragments, colloidal components, cell proteins, DNA, viruses and endotoxins. The separation here includes at least one of the undesired biological contaminants from the liquid medium, while target products which are also contained in the liquid medium can pass through the depth filter layer unimpeded and in active form. Target products are understood to mean all products which are to be obtained by means of the upstream production process. Preferably the target products comprise biomolecules. Particularly preferably, target products are understood to mean proteins, peptides, polypeptides or hormones. In particular, target products are understood to mean therapeutic proteins. Here, liquid media are understood to mean all media which enable contacting of the components to be separated with the depth filter. In particular here these are aqueous or water-containing media in the form of a solution, suspension, dispersion, emulsion or colloidal solution. In this all liquid media from normal practice can be used, such as for example biological and biotechnological solutions, medical solutions, solutions from the food, drink, animal feed and waste industries and solutions from the chemical industry. Preferably, the depth filter layers according to the invention are used for the filtration of liquid media from the biological, biotechnological and pharmaceutical industry and from the food and drink industry. Particularly preferably, the depth filter layers are used for the filtration of biological and biotechnological solutions. In the practical examples, the depth filter layers are used for the filtration of cell culture solutions and DNA- and protein-containing biological solutions. Here, the removal of the components to be separated from the liquid media to be filtered can be effected via size exclusion, via adsorptive mechanisms, via ion exchange processes and/or intercalation.

If necessary, depending on the process the new depth filter layers must be prepared before their use by rinsing processes, such as for example prerinsing with water or with buffer-containing solutions. If necessary, the liquid media to be filtered must also be prepared before their use depending on the process, such as for example by prefiltration or centrifugation.

In order to utilize a depth filter layer appropriately, the present invention further provides a filtration device which contains the depth filter layer characterized above. The filtration device according to the invention preferably comprises a filter housing of metal or particularly preferably of plastic or of similar materials, which enable inexpensive single use of the filtration device, and at least one of the depth filter layers characterized above.

Further, a method is provided for the separation of at least one biological contaminant from at least one target product in a liquid medium, comprising the steps:
(a) contacting the liquid medium which contains the at least one contaminant and the at least one target product with at least one depth filter layer according to the invention,
(b) retention of the at least one contaminant by the at least one depth filter layer and
(c) obtention of a filtrate containing the at least one target product and the liquid medium.

As an additional step (d), in a further preferred embodiment a washing of the depth filter layer can be effected with the liquid medium and/or with a rinsing medium after step (c) to increase the content of the at least one target product in the filtrate.

The process according to the invention can stand alone or be part of a more complex process which includes further subsequent purification steps.

Finally, the present invention provides the use of a depth filter layer characterized above for the removal of contaminants.

FIGS. 1 to 6 show breakthrough curves, which are explained in more detail below.

The present invention and further advantages arising therefrom are explained in more detail in the following description with reference to the embodiments described in the examples.

EXAMPLES

Description of the Analytical Methods

Static DNA and Protein Binding

For the determination of the static binding capacity of inorganic powders, defined suspensions of the powders in distilled water are prepared with a content of 50 mg inorganic powder/ml distilled water. The suspensions are divided into 1 ml aliquots in 10 ml plastic centrifuge tubes. To the aliquots are added a further 3.5 ml of dist. water and 0.5 ml of 10× concentrated PBS buffer (2.4 g $KH_2PO_4$/l, 14.4 g $Na_2HPO_4 \cdot 2H_2O$/1.80 g NaCl/l, 2 g KCl/l in water) which is mixed and incubated for 10 min. with shaking for equilibration. The supernatant is removed after centrifugation. The equilibrated powder is incubated with 2.5 ml of a DNA test solution or a protein test solution for 3 hrs at room temperature with shaking. As the test solution, salmon sperm DNA (Na salt, size distribution 500-1000 base pairs, product number 54653, Biomol) or a polyclonal human IgG mixture (Cytoglobin®/Bayer Vital, D-Leverkusen) with a concentration of 1 mg/ml dissolved in 1× concentrated PBS buffer is used. Next, after centrifugation, the DNA or protein concentration of the supernatant is determined photometrically on the basis of a standard series.

BET Determination of Inorganic Powders and Depth Filter Materials

The determination of the adsorptive surface of the materials by the Brunauer-Emmet-Teller (BET) method is effected using the Gemini BET system (Micromeretics). For the preparation, glass sample tubes are ca. 25% filled with the samples and heated for 2 hrs under vacuum at 120° C. for drying. The weight of the dried sample taken is determined on the basis of the weight difference from the empty sample tube. For the measurement of the BET surface area, the sample tube is fixed in the Gemini BET system in the mounting provided. The measurement is effected in comparison to an empty reference tube with cooling with liquid nitrogen. The measurement and assessment are effected by starting the device's software by recording 11 measured points at an evacuation rate of 200 mm Hg/min. and with the assumption of the following physical properties for nitrogen:
Density: 0.0015468, Non-ideality factor: 0.000062, molecular cross-sectional area: 0.162 $mm^2$.

Dynamic DNA and Protein Binding

The determination of the dynamic binding capacities to depth filter layers is effected by means of round pressed discs with a diameter of 47 mm and an effective filter area of 13.2 $cm^2$ in flow mode under constant flow at a flow rate of 4.3 ml/min. The pressed discs are laid in a stainless steel filtration housing (Sartorius Stedim Biotech GmbH), prerinsed with 200 ml of reverse osmosis (RO) water and then with 60 ml of 1× concentrated PBS buffer and then thoroughly rinsed with a DNA or protein test solution. As the test solution, salmon sperm DNA (Na salt, size distribution 500-1000 base pairs, product number 54653, Biomol) with a concentration of 0.5 mg/ml or a polyclonal human IgG mixture (Cytoglobin®/Bayer Vital, Leverkusen) with a concentration of 1 mg/ml dissolved in 1× concentrated PBS buffer is used. In addition, as the test solution a mixture of DNA and IgG is used. To this are added salmon sperm DNA (Na salt, size distribution 500-1000 base pairs, product number 54653, Biomol) with a concentration of 0.5 mg/ml and at the same time a polyclonal, human IgG mixture (Cytoglobin®/Bayer Vital, Leverkusen) with a concentration of 1 mg/ml dissolved in 1× concentrated PBS buffer. The extinction values of the filtrate are recorded by an online photometer at 260 nm and at 280 nm respectively, from which the concentrations are determined by means of a standard series. With the mixture of DNA and the polyclonal, human IgG mixture, the DNA concentrations are calculated by means of the formula A×[extinction 260 nm]−B×[extinction 280 nm] and the IgG concentration with the formula C×[extinction 280 nm]−D×[extinction 260 nm]. The coefficients A-D are calculated as instrument-specific constants from the extinction coefficients of the DNA and the polyclonal, human IgG mixture, as described in K. L. Manchester, BioTechniques 20 (6) 1996, 968-970. The assessment of the breakthrough curves is made by determination of the 50% dynamic breakthrough (DBT) and the cumulative binding of the cumulative transmission over the whole course of the filtration. 50% DBT is understood to mean the attainment of the 50% concentration level in the filtrate stream, based on the DNA or IgG concentration used.

Water Flow

For the measurement of the water flow, a round depth filter pressed disc of 47 mm diameter is laid in a filter holder of 200 ml capacity (Sartorius Stedim Biotech GmbH SM 16249) and prerinsed with 100 ml of water at 1 bar differential pressure. Then the flow time in [s] for 100 ml water at 1 bar differential pressure is determined with a stop watch. The water flow rate is calculated with the assumption of an effective filter area of 12.57 $cm^2$ with the formula: water flow rate [l/$m^2$ min]=0.1 [l]/(12.57×$10^{-4}$ [$m^2$]×time [min]).

Weight Determination, Thickness Measurement and Density Determination

The determination of weight, thickness and density of depth filter layers is effected by means of round pressed discs with a diameter of 47 mm corresponding to a filter area of 17.35 $cm^2$.

The weight is determined with a precision of 1 mg with a test material-monitored balance (Sartorius LP 3200 D).

The determination of the average thickness of the depth filter samples is effected with a thickness measuring device from Hahn & Kolb (precision 0.01 mm). The thickness is measured at four edge points and in the middle of the pressed disc. The average thickness is calculated as the average of the five measured points.

The density is calculated from the values determined for thickness and weight according to the formula:

$$\text{Density [g/cm}^3\text{]=Weight [g]/(17.35 cm}^2\text{×Thickness [cm]).}$$

(A) Depth Filters Used
Depth filter 1: C8HP (Sartorius Stedim Biotech GmbH)
Depth filter 2: S5P (Sartorius Stedim Biotech GmbH)
Depth filter 3: 40DE (Millipore Corp.)
Depth filter 4: 75DE (Millipore Corp.)
Depth filter 5: HT500, according to the invention, as per (B)
Depth filter 6: HT750, according to the invention, as per (B)
Depth filter 7: HT900, according to the invention, as per (B)
Depth filter 8: HT500G, according to the invention, as per (B)

(B) Composition of the Depth Filters According to the Invention

Depth Filter 5 (HT500):

37.5 weight percent cellulose fibres (Weyerhaeuser Tyee), 0.5 weight percent carboxymethylcellulose, 38 weight percent hydrotalcite Syntal® 696 (0.8 μm-25 μm), 22 weight percent kieselguhr SA3, 2 weight percent Kymene®.

Depth Filter 6 (HT750):
32.5 weight percent cellulose fibres (Weyerhaeuser Tyee), 0.5 weight percent carboxymethylcellulose, 45 weight percent hydrotalcite Syntal® 696 (0.8 µm-25 µm), 20 weight percent kieselguhr SA3, 2 weight percent Kymene®.

Depth Filter 7 (HT900):
34.5 weight percent cellulose fibres (Weyerhaeuser Tyee), 0.5 weight percent carboxymethylcellulose, 63 weight percent hydrotalcite Syntal® 696 (0.8 µm$^{-25}$ µm), 2 weight percent Kymene®.

Depth filter 8 (HT500G):
27.5 weight percent cellulose fibres (Weyerhaeuser Tyee), 0.5 weight percent carboxymethylcellulose, 55 weight percent hydrotalcite Syntal® 696 (1 µm-278 µm), 15 weight percent kieselguhr SA3, 2 weight percent Kymene®.

(C) Characterization of the Hydrotalcite Powder Syntal® 696

The binding of salmon sperm DNA: (Na salt, size distribution 500-1000 base pairs, product number 54653, Biomol) and of a polyclonal human IgG mixture (Cytoglobin®/Bayer Vital, D-Leverkusen) in the static system was measured. The exact procedure was as described in the above section "Analytical Methods".

TABLE 1

| Inorganic powder (particle size distribution [µm]) | BET surface area [m$^2$/g] | DNA binding [%] | IgG binding [%] |
|---|---|---|---|
| Kieselguhr SA3 | 32 | 3 | 60 |
| Hydrotalcite Syntal ® 696 (0.8 µm-25 µm) | 50 | 61 | 34 |
| Hydrotalcite Syntal ® 696 (1 µm-278 µm) | 54 | 71 | 24 |

Kieselguhr binds almost no DNA. Hydrotalcite exhibits high DNA binding. Disadvantageously, both powders bind the target protein IgG in large amounts.

(D) Characterization of the Depth Filters

The determination of the water flow, thickness, weight, density and BET surface area of the depth filters is effected as described in the above section "Analytical Methods".

TABLE 2

| Depth filter | DF1 (C8HP) | DF2 (S5P) | DF3 (40DE) | DF4 (75DE) |
|---|---|---|---|---|
| Water flow (100 ml/1 bar) [s] | 4.7 | 54 | 6.0 | 74 |
| Thickness [mm] | 4.2 | 4.2 | 3.7 | 3.4 |
| Weight [g] Ø 47 mm 17.35 cm$^2$ | 1.9 | 2.9 | 2.0 | 2.6 |
| Density [g/cm$^3$] | 0.26 | 0.40 | 0.31 | 0.44 |
| BET surface area | | | | |
| [m$^2$/cm$^3_{depth\,filter}$] | 1.2 | 5.7 | | 4.0 |
| [m$^2$/g$_{depth\,filter}$] | 4.7 | 14.3 | | 9.1 |

| Depth filter | DF5 (HT500) | DF6 (HT750) | DF7 (HT900) | DF8 (HT500G) |
|---|---|---|---|---|
| Water flow (100 ml/1 bar) [s] | 67 | 65 | 90 | 7.7 |
| Thickness [mm] | 3.4 | 3.7 | 3.4 | 4.1 |
| Weight [g] Ø 47 mm 17.35 cm$^2$ | 2.6 | 2.9 | 2.8 | 2.9 |
| Density [g/cm$^3$] | 0.43 | 0.45 | 0.48 | 0.41 |
| BET surface area | | | | |
| [m$^2$/cm$^3_{depth\,filter}$] | 9.6 | 11.3 | 13.8 | 13.3 |
| [m$^2$/g$_{depth\,filter}$] | 22.2 | 25.4 | 28.8 | 32.5 |

DNA Binding in the Dynamic System

The determination of the DNA binding in the dynamic system is effected as described in the above section "Analytical Methods".

TABLE 3

| Depth filter | 50% DBT [mg$_{DNA}$/ml$_{DF}$] | 50% DBT [mg$_{DNA}$/cm$^2_{DF}$] | DNA binding [mg$_{DNA}$/cm$^2_{DF}$] | DNA binding [%] |
|---|---|---|---|---|
| DF1 (C8HP) | 0.61 (±0.01) | 0.31 (±0.01) | 0.65 (±0.01) | 9 |
| DF2 (S5P) | 1.44 (±0.07) | 0.76 (±0.07) | 1.32 (±0.09) | 19 |
| DF3 (40DE) | 0.75 (±0.00) | 0.36 (±0.00) | 0.78 (±0.2) | 10 |
| DF4 (75DE) | 0.69 (±0.04) | 0.29 (±0.005) | 0.60 (±0.004) | 8 |
| DF5 (HT500) | 5.34 (±0.58) | 2.36 (±0.26) | 2.97 (±0.25) | 41 |
| DF6 (HT750) | 6.10 (±0.05) | 2.91 (±0.09) | 3.53 (±0.09) | 48 |
| DF7 (HT900) | 7.74 (±0.52) | 3.48 (±0.26) | 3.96 (±0.24) | 53 |
| DF8 (HT500G) | 3.97 (±0.28) | 2.37 (±0.03) | 2.71 (±0.25) | 40 |

Transmission of the polyclonal human IgG mixture in the dynamic system

The determination of the IgG binding in the dynamic system is effected exactly as described in the above section "Analytical Methods".

TABLE 4

| Depth filter | 50% DBT [mg$_{IgG}$/ml$_{DF}$] | 50% DBT [mg$_{IgG}$/cm$^2$$_{DF}$] | IgG binding [mg$_{IgG}$/cm$^2$$_{DF}$] | IgG-Transmission [%] |
|---|---|---|---|---|
| DF1 (C8HP) | 1.45 (±0.03) | 0.77 (±0.00) | 1.77 (±0.05) | 91 |
| DF2 (S5P) | 3.20 (±0.18) | 1.62 (±0.11) | 2.89 (±0.06) | 86 |
| DF3 (40DE) | 1.39 (±0.03) | 0.65 (±0.01) | 1.2 (±0.03) | 94 |
| DF4 (75DE) | 2.35 (±0.08) | 1.06 (±0.04) | 2.03 (±0.02) | 90 |
| DF5 (HT500) | 5.54 (±0.40) | 1.11 (±0.16) | 2.62 (±0.11) | 87 |
| DF6 (HT750) | 2.85 (±0.02) | 1.29 (±0.00) | 2.80 (±0.01) | 86 |
| DF7 (HT900) | 2.22 (±0.03) | 1.00 (±0.05) | 2.44 (±0.11) | 89 |
| DF8 (HT500G) | 1.81 (±0.01) | 1.00 (±0.05) | 2.51 (±0.01) | 88 |

For a comparative characterization of depth filters it is necessary to divide these into groups with similar water flow time. Below, depth filters with a water flow time of less than 10 seconds are grouped as coarse depth filters and depth filters with a water flow time of greater than 50 seconds are designated as narrow depth filters. Here, the water flow time is based on a depth filter with a diameter of 47 mm and 100 ml of distilled water at 1 bar differential pressure.

Figure 1:
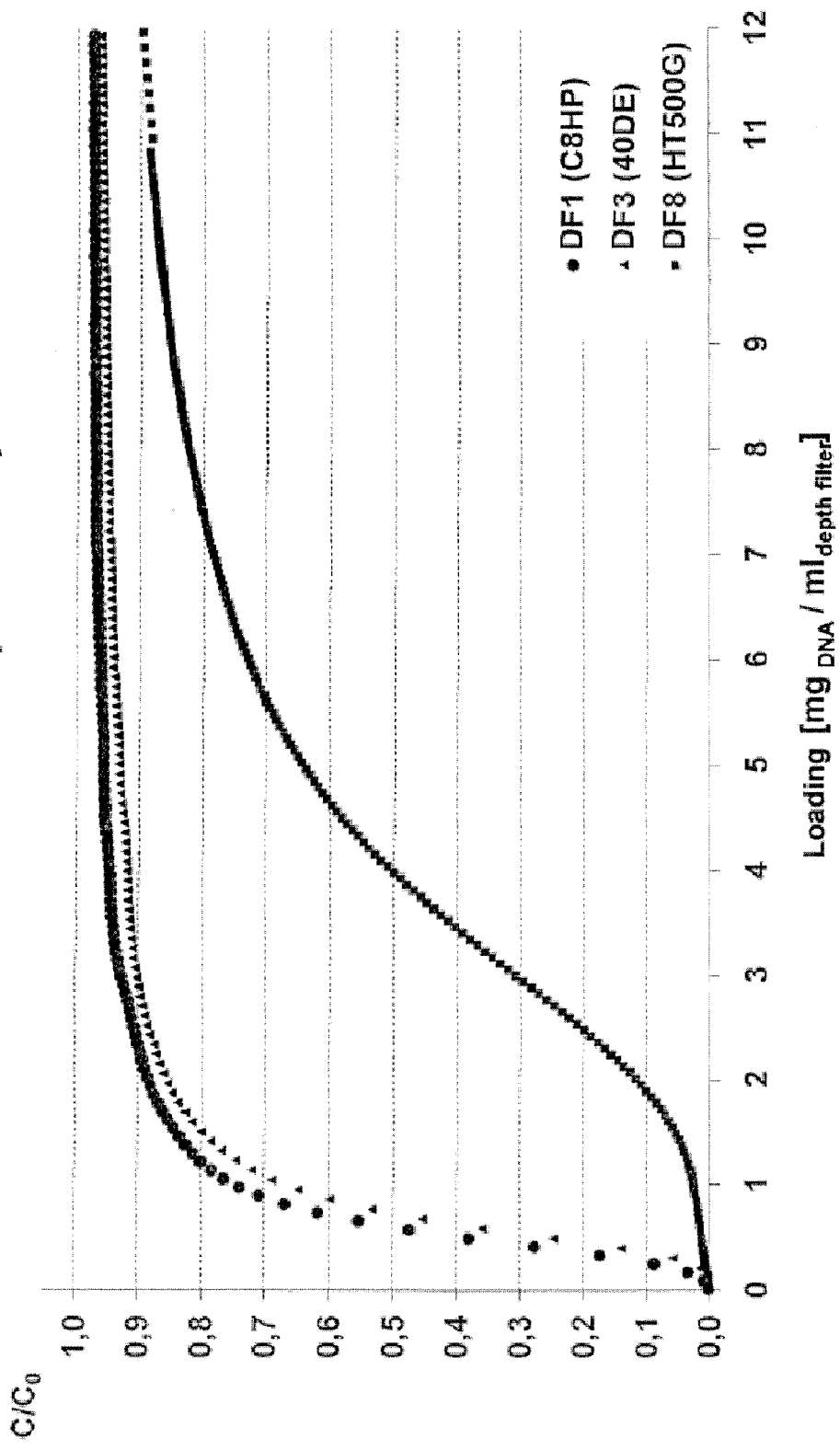
FIG. 1 shows breakthrough curves for the coarse depth filter according to the invention DF8, and for coarse depth filters known from the state of the art DF1 and DF3 with a loading with salmon sperm DNA. All three depth filters have similar water flow times and are coarser than the depth filters DF2, DF4 and DF5 to DF7.
Figure 2:
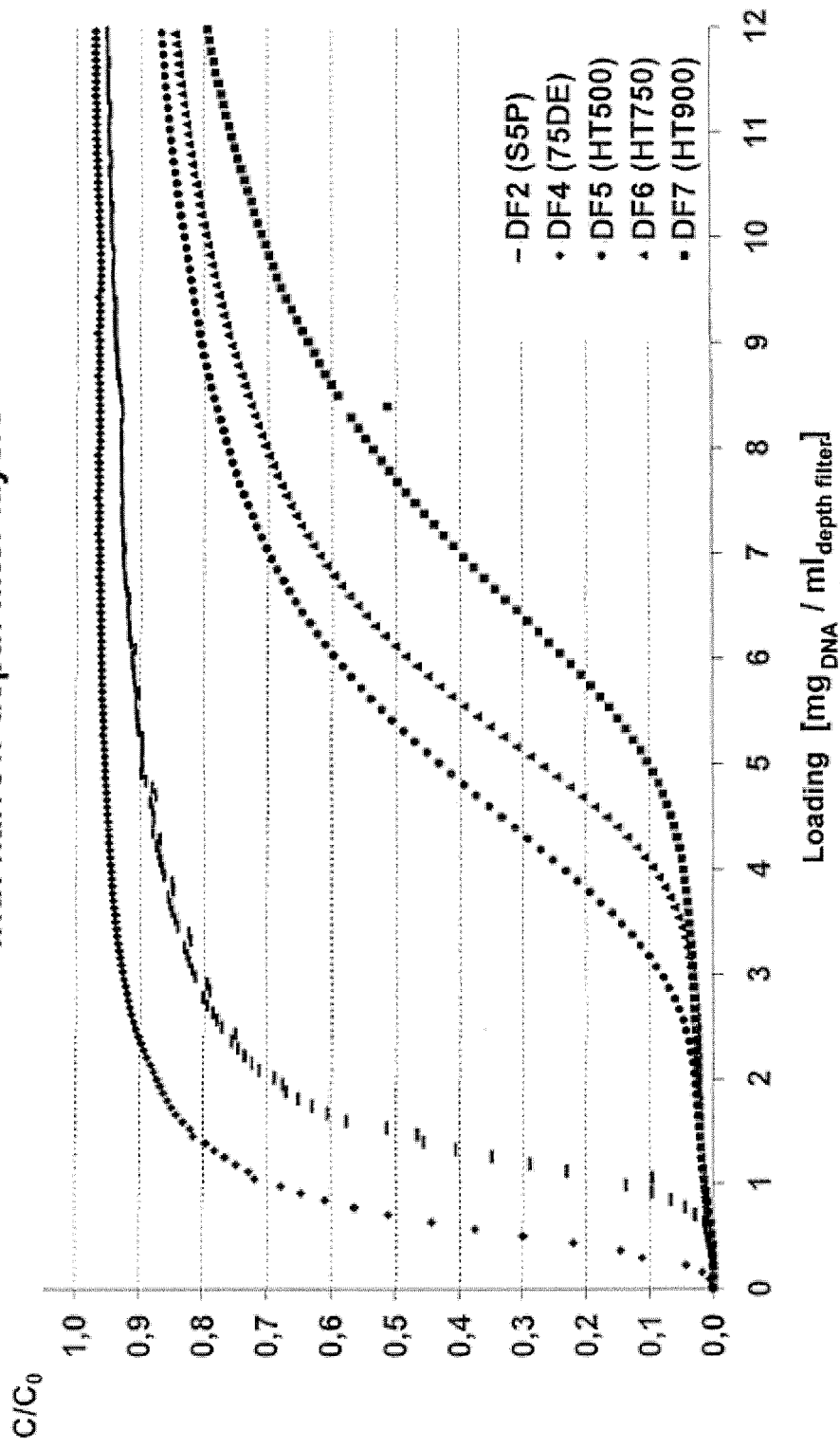
FIG. 2 shows breakthrough curves for narrow depth filters known from the state of the art DF2 and DF4 and for the narrow depth filters according to the invention DF5, DF6 and DF7 with a loading with salmon sperm DNA. All five depth filters have similar water flow times and are narrower than the depth filters DF1, DF3 and DF8.

With the depth filter layers according to the invention, compared to the state of the art depletions of DNA from solutions up to 10 times as high can be attained (Table 3, "50% DBT", e.g. DF4 versus DF7). FIGS. 1 and 2 show that with the depth filter layers according to the invention, both with narrow and also with coarser embodiments the breakthrough of DNA into the filtrate only takes place markedly later than with depth filter layers of the state of the art, i.e. only after increased loading of the depth filter layer with a DNA-containing solution. This advantage is seen on the one hand in the delayed DNA breakthrough in the practical examples of Table 3 (compare "50% DBT" in table), and on the other hand the increased DNA binding capacity is also seen in the flattened shape of the DNA breakthrough curve with the depth filters according to the invention compared to depth filters from the state of the art. The latter property has the effect that the depth filters according to the invention also retain their advantage as regards their DNA depletion capacity with prolonged exposure time (see values for DNA binding in Table 3).

Figure 3:
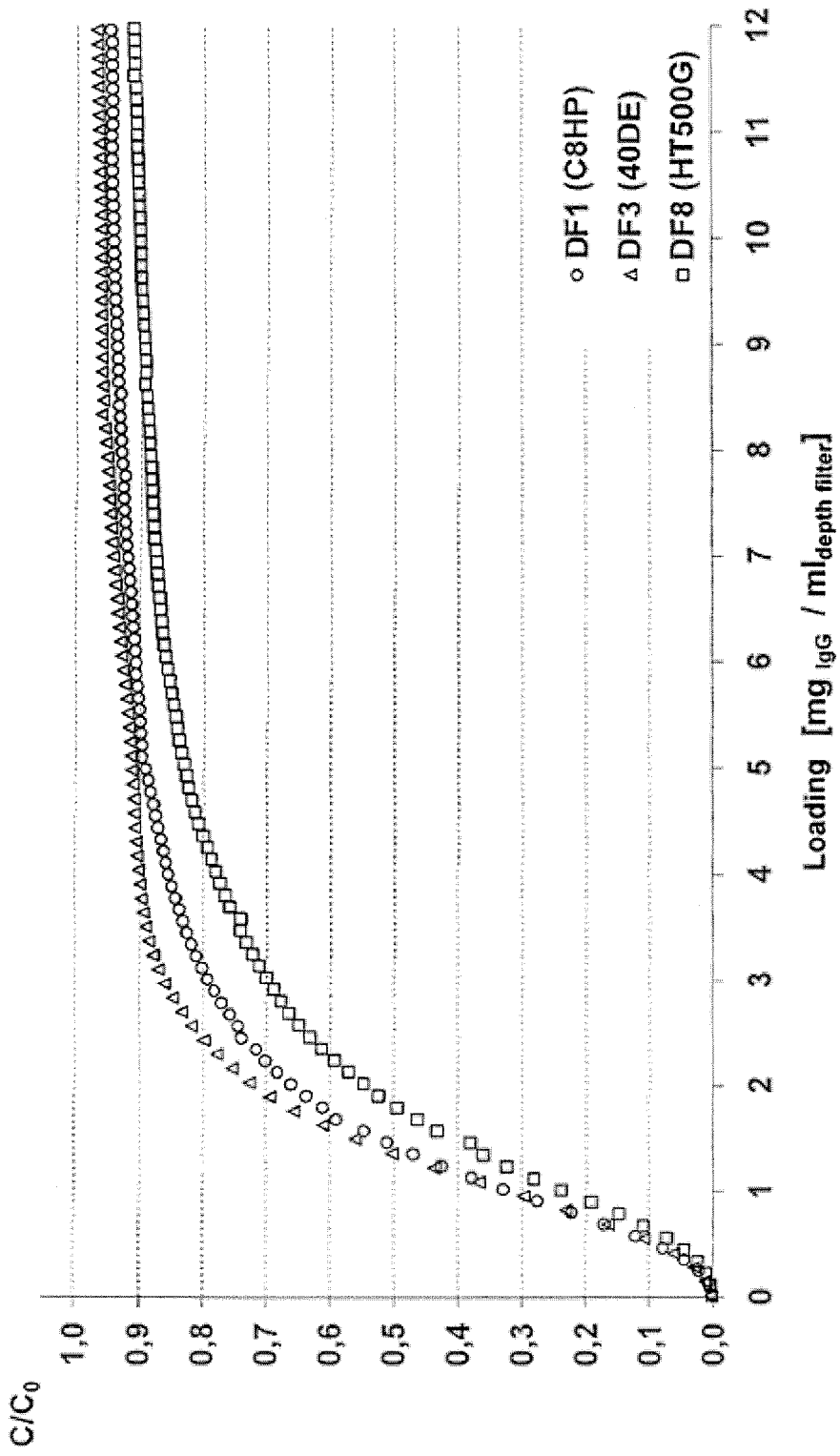
FIG. 3 shows breakthrough curves for coarse depth filters known from the state of the art DF1 and DF3 and for the coarse depth filter according to the invention DF8 with a loading with a polyclonal, human immunoglobin mixture (IgG mixture).
Figure 4:
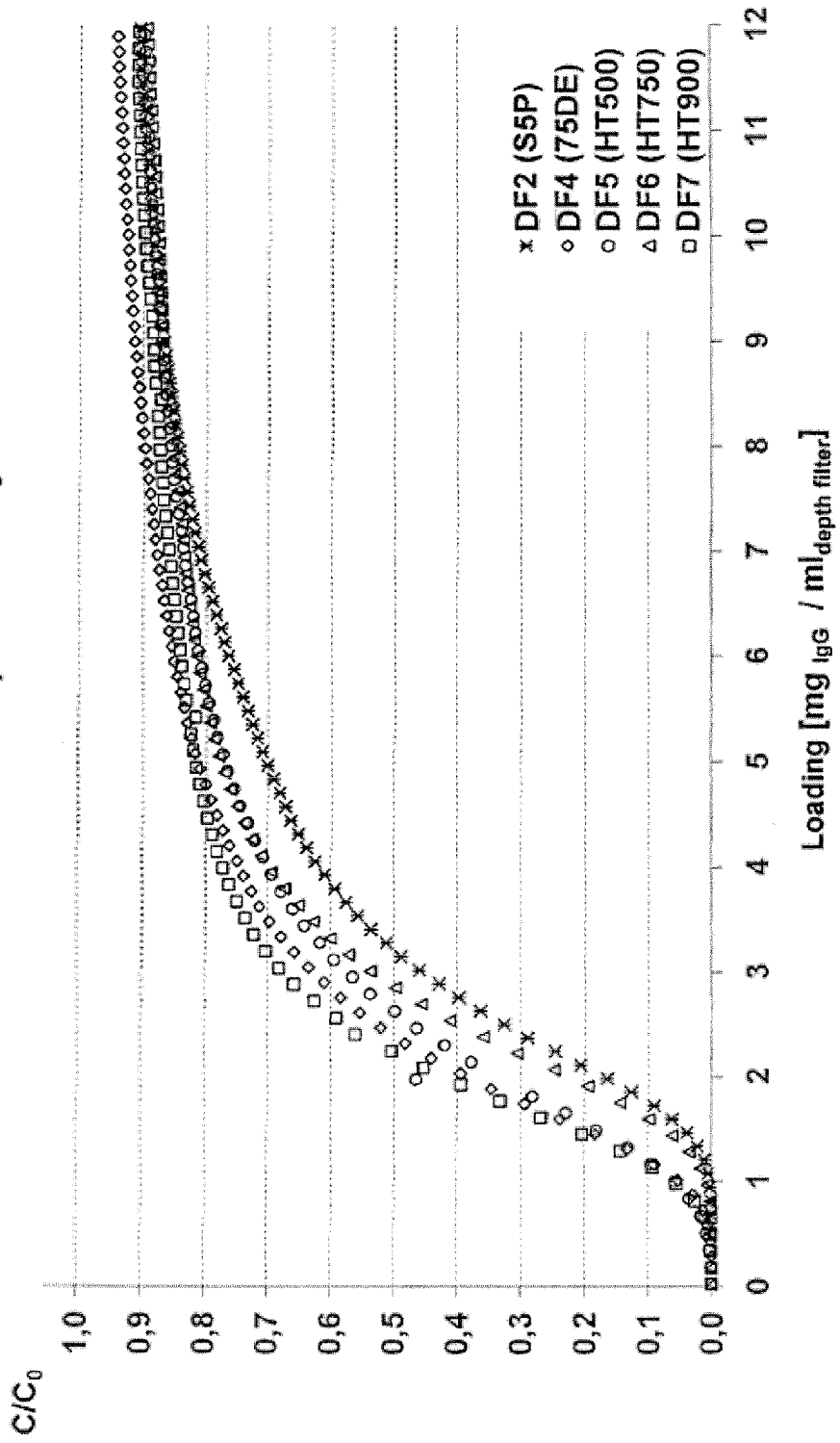
FIG. 4 shows breakthrough curves for narrow depth filters known from the state of the art DF2 and DF4 and for the narrow depth filters according to the invention DF5, DF6 and DF7 with a loading with a polyclonal, human immunoglobulin mixture.

Furthermore, compared to the state of the art, the desired target protein, i.e. the polyclonal human IgG mixture, is not bound more strongly to the depth filter layers according to the invention (FIGS. 3 and 4). Thus the depth filters according to the invention in the coarse and narrow embodiments have advantageous properties as regards the dynamic breakthrough of the IgG mixture and the whole shape of the breakthrough curve compared to depth filters according to the state of the art.

Figure 5:
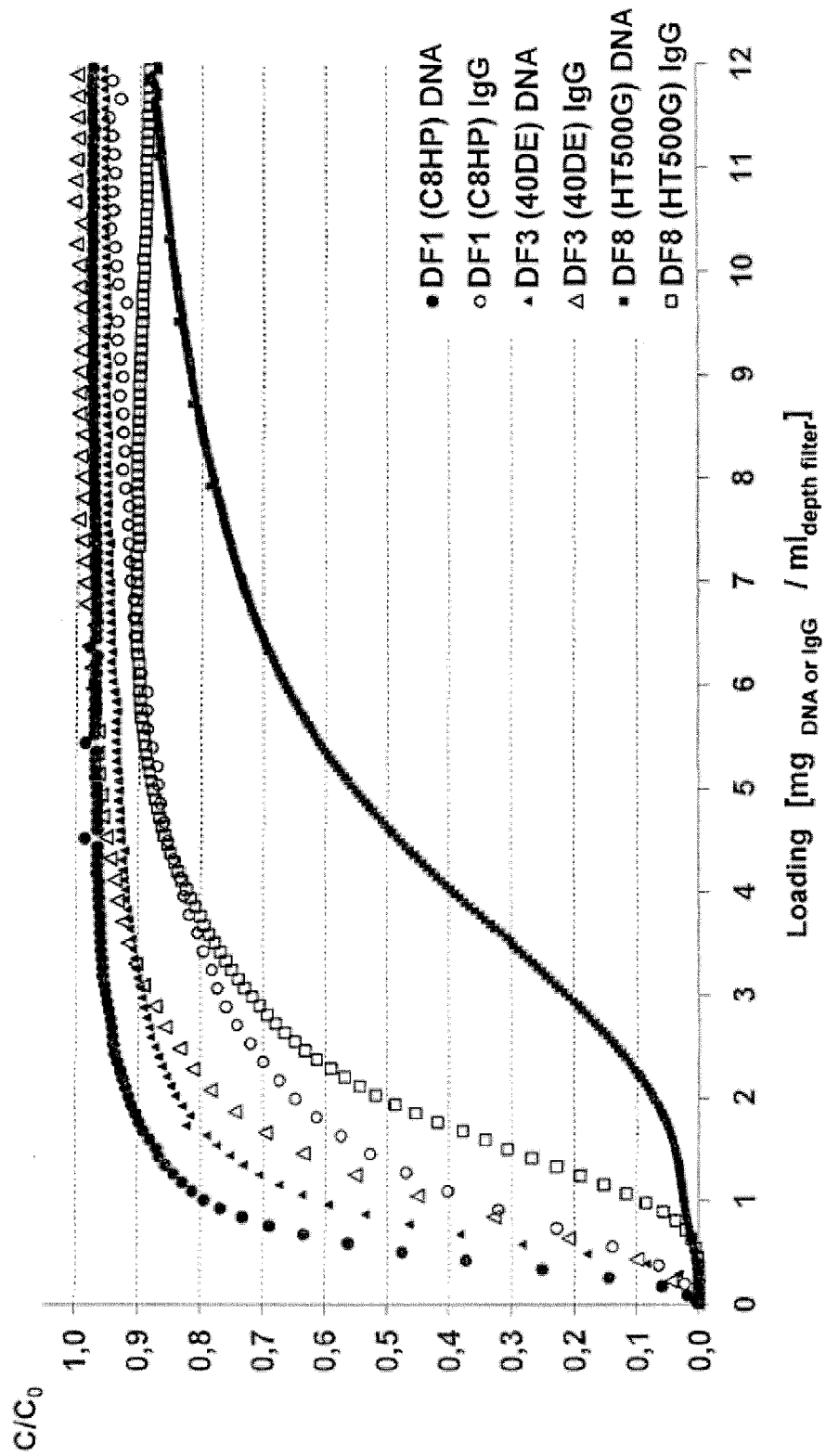
FIG. 5 shows breakthrough curves for the coarse depth filter according to the invention DF8 and for coarse depth filters known from the state of the art DF1 and DF3 with a loading with a mixture of salmon sperm DNA and polyclonal, human immunoglobulins.
Figure 6:
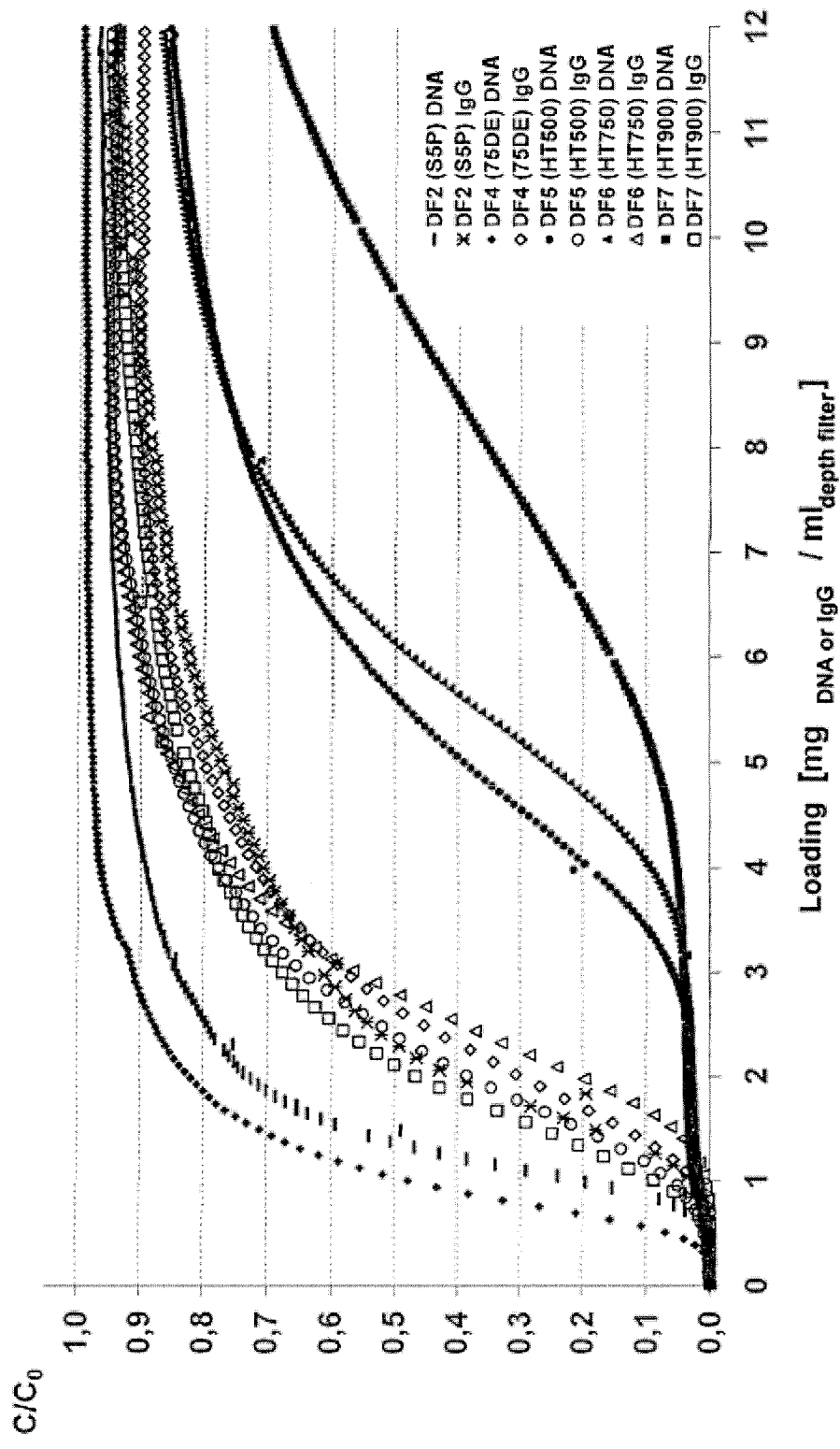
FIG. 6 shows breakthrough curves for the narrow depth filters according to the invention DF5, DF6 and DF7 and for narrow depth filters known from the state of the art DF2 and DF4 with a loading with a mixture of salmon sperm DNA and polyclonal, human immunoglobulins.

These advantageous properties of the depth filter layers according to the invention are also seen in the filtration of mixtures which contain a target protein and a contaminant in phosphate-buffered common salt solution, as described in the above section "Analytical Methods". FIGS. 5 and 6 show the breakthrough behaviour of a mixture of two components consisting of target protein (polyclonal, human IgG mixture) and contaminant (salmon sperm DNA). With all four examples of depth filters according to the state of the art, the breakthrough of the DNA takes place earlier than the breakthrough of the IgG fraction. Hence with depth filters of the state of the art no selective separation of the contaminant from the target protein is possible. On the other hand, the depth filters according to the invention show a contrasting breakthrough behaviour. With experimental conditions identical to those for the depth filters according to the state of the art, the breakthrough of the target protein occurs markedly before the breakthrough of the contaminant DNA. Hence a marked reduction of DNA in the filtrate with equally good product transmission is only enabled by the depth filters according to the invention (by a factor of 10; Table 3, "50% DBT"). FIG. 5 shows the breakthrough behaviour for coarse depth filter layers and FIG. 6 for narrow depth filter layers. The aforesaid advantage of the depth filter layers according to the invention is clearly recognisable for both comparisons. The advantageous separation of contaminating DNA by the depth filters according to the invention is thus retained over a wide range of variation of the openness of these filters. Hence it is possible to adapt the depth filters according to the invention to the particle distribution of the medium to be filtered and at the same time to retain the selective separation of contaminants according to the invention.

Hence, with the depth filter layers according to the invention, containing for example hydrotalcite, for the first time selective depth filter layers can be provided which in addition to the conventional cell and cell fragment separation and the removal of colloidal components also simultaneously remove large quantities of DNA from cell culture solutions, while the target products can pass through the depth filter unimpeded and in active form. Thus the depth filter layers according to the invention, containing for example hydrotalcite, yield filtrates of improved quality in terms of reduced contaminant concentrations, which advantageously leads to simplification of the subsequent and sometimes costly purification steps in the "downstream process". Thereby, cost-intensive steps in the final part of the "downstream" process can be performed on a markedly smaller scale, which leads to a cost reduction in terms of the process costs, but also to a cost reduction due to lower product loss of target protein. At the same time, the physicochemical stability of the new depth filter layers also allows use before and after the chromatography steps in the "downstream" processing of cell culture solutions, since high DNA binding capacities in the conductivity profile of the cell culture supernatants are attained. The depth filter layers according to the invention show adequately high stabilities in terms of the relevant parameters such as pH, temperature, pressure and flow in the relevant process window of the "downstream" process. The depth filter layers according to the invention can very simply be processed into disposable products which are usable with the greatest possible safety with the avoidance of cross-contamination in biotechnological, medical and pharmaceutical production processes.

The inorganic layer double hydroxide powders can very effectively be incorporated into the depth filter layers according to the invention and with appropriately adapted particle size distributions depth filter layers of different openness or with various water flow rates can also be produced. This allows still more flexible use of the depth filter layers corresponding to the requirement profile of the particular process solution to be filtered.

The invention claimed is:

1. A depth filter layer, produced from
cellulose fibres and/or derivatives thereof,
at least one inorganic layer double hydroxide, and
at least one organic wet strength agent,
wherein the depth filter layer is produced from a mixture comprising a content by weight of the at least one inorganic layer double hydroxide of 10-65%, a content by weight of the cellulose fibres and/or derivatives thereof of 30-80% and a content by weight of the organic wet strength agent of 0.5-10%, based on the total weight of the mixture, and wherein the at least one organic wet strength agent reacts with carboxyl and/or OH groups of the cellulose fibres and/or derivatives thereof and the at least one inorganic layer double hydroxide to bridge components of the mixture to one another;
wherein the at least one inorganic layer double hydroxide comprises particles with an average diameter between 0.5 μm and 100 μm; and
wherein the depth filter layer is configured to bind nucleic acids adsorptively to the depth filter layer and to allow proteins to pass through the depth filter layer unimpeded.

2. The depth filter layer according to claim 1, wherein the at least one inorganic layer double hydroxide contains monovalent alkali metal ions $M^+$ and/or divalent alkaline earth or transition metal ions $M^{2+}$, trivalent main group or transition metal ions $M^{3+}$, n-valent anions $A^{n-}$ with n=1-4 and hydroxide ions $OH^-$.

3. The depth filter layer according to claim 2, wherein the monovalent alkali metal ion $M^+$ is $Li^+$, $Na^+$, alone or in combination, the divalent alkaline earth or transition metal ion $M^{2+}$ is selected from the group of $Mg^{2+}$, $Sr^{2+}$, $Ba^{2+}$, $Ni^{2+}$, $Cu^{2+}$, $Co^{2+}$, $Zn^{2+}$, $Fe^{2+}$, $Mn^{2+}$, $Ca^{2+}$ or combinations thereof, the trivalent main group or transition metal ion $M^{3+}$ is selected from the group of $B^{3+}$, $Al^{3+}$, $Ga^{3+}$, $Ni^{3+}$, $Co^{3+}$, $Cr^{3+}$, $Fe^{3+}$, $Mn^{3+}$, $V^{3+}$, $Ti^{3+}$, $Sc^{3+}$, $In^{3+}$ or combinations thereof and the n-valent anion is selected from the group of $F^-$, $Cl^-$, $Br^-$, $I^-$, $NO_3^-$, $ClO_4^-$, $ClO_3^-$, $IO_3^-$, $CO_3^{2-}$, $SO_4^{2-}$, $PO_4^{3-}$, $AsO_4^{3-}$, $S_2O_3^{2-}$, $WO_4^{2-}$, $CrO_4^{2-}$, $[Fe(CN)_6]^{3-}$, $[Fe(CN)_6]^{4-}$, $[SiO(OH)_3]^-$, hetero polyacids, organic acids, organometallic complexes or combinations thereof.

4. The depth filter layer according to claim 1, wherein the inorganic layer double hydroxide contains water of crystallization.

5. The depth filter layer according to claim 1, wherein the inorganic layer double hydroxide has the formula $$[(M^{2+})_{1-x}(M^{3+})_x(OH)_2]^{x+}(A^{n-}_{x/n})*mH_2O$$

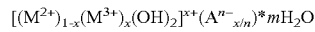

and that $0.1 \leq x \leq 0.5$, $1 \leq n \leq 4$ and m is a rational number including 0.

6. The depth filter layer according to claim 1, wherein the inorganic layer double hydroxide has the formula $$[(M^+)_{1-x}(M^{3+})_x(OH)_2]^{(2x-1)+}(A^{n-}_{(2x-1)/n})*mH_2O$$

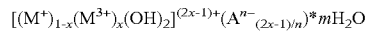

and that $0.1 \leq x \leq 0.5$, $1 \leq n \leq 4$ and m is a rational number including 0.

7. The depth filter layer according to claim 1, wherein the inorganic layer double hydroxide is hydrotalcite $$Mg_6Al_2(CO_3)(OH)_{16}*4H_2O.$$

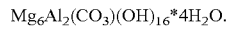

8. The depth filter layer according to claim 7, wherein hydrotalcite is not calcined.

9. The depth filter layer according to claim 1, wherein the at least one organic wet strength agent is water-soluble and positively charged.

10. The depth filter layer according to claim 9, wherein the at least one organic wet strength agent is selected from the group of polyamide/polyamine-epichlorohydrin resins, polyamide-epichlorohydrin resins, polyamine-epichlorohydrin resins, or mixtures thereof.

11. The depth filter layer according to claim 1, wherein the depth filter layer is additionally produced with silicon dioxide and/or at least one derivative thereof.

12. The depth filter layer according to claim 1, wherein the depth filter layer is additionally produced with kieselguhr or perlites or mixtures thereof.

13. The depth filter layer according to claim 11, wherein the silicon dioxide and/or the at least one derivative comprises particles with an average diameter between 0.5 μm and 100 μm.

14. The depth filter layer according to claim 12, wherein kieselguhr, perlite or the mixture thereof comprises particles with an average diameter between 0.5 μm and 100 μm.

15. The depth filter layer according to claim 11, wherein the depth filter layer is produced from a mixture in which the content by weight of the at least one inorganic layer double hydroxide and the silicon dioxide and/or the at least one derivative thereof is 20-75%, the content by weight of the cellulose fibres and/or derivatives thereof is 30-80% and the content by weight of the organic wet strength agent is 0.5-10% and the contents by weight add up to 100%.

16. The depth filter layer according to claim 12, wherein the depth filter layer is produced from a mixture in which the content by weight of the at least one inorganic layer double hydroxide and the kieselguhr or the perlite or the mixtures thereof is 20-75%, the content by weight of the cellulose fibres and/or derivatives thereof is 30-80% and the content by weight of the organic wet strength agent is 0.5-10% and the contents by weight add up to 100%.

17. A method for producing a depth filter layer, the method comprising the steps of:
   (1) preparing cellulose fibres and/or derivatives thereof in at least one liquid medium;
   (2) adding at least one inorganic layer double hydroxide;
   (3) adding at least one organic wet strength agent to the mixture obtained in step (2);
   (4) applying the suspension obtained in step (3) onto a carrier;
   (5) removing the at least one liquid medium; and
   (6) drying the depth filter layer obtained in step (5),
   wherein the depth filter layer is produced from a mixture comprising a content by weight of the at least one inorganic layer double hydroxide of 10-65%, a content by weight of the cellulose fibres and/or derivatives thereof of 30-80% and a content by weight of the organic wet strength agent of 0.5-10%, based on the total weight of the mixture, and wherein the at least one organic wet strength agent reacts with carboxyl and/or OH groups of the cellulose fibres and/or derivatives thereof and the at least one inorganic layer double hydroxide to bridge components of the mixture to one another;
   wherein the at least one inorganic layer double hydroxide comprises particles with an average diameter between 0.5 µm and 100 µm; and
   wherein the depth filter layer is configured to bind nucleic acids adsorptively to the depth filter layer and to allow proteins to pass through the depth filter layer unimpeded.

18. The method according to claim 17, wherein the at least one organic wet strength agent is added in step (2) and the at least one inorganic layer double hydroxide is added in step (3).

19. The method according to claim 17, wherein the cellulose fibres and/or derivatives thereof are milled after step (1) and before step (2).

20. The method according to claim 17, wherein the depth filter layer is dried at 100° C. to 250° C. in step (6).

21. The method according to claim 17, wherein silicon dioxide and/or at least one derivative thereof is added as a further component before step (4).

22. The method according to claim 17, wherein silicon dioxide and/or at least one derivative thereof is added together with the at least one inorganic layer double hydroxide in step (2).

23. The method according to claim 17, wherein kieselguhr, perlite or a mixture thereof is added as further components before step (4).

24. The method according to claim 17, wherein kieselguhr, perlite or a mixture thereof is added together with the at least one inorganic layer double hydroxide as further components in step (2).

25. A filtration device, containing at least the depth filter layer according to claim 1.

26. A method for separating nucleic acids from proteins in a liquid medium by using at least the depth filter layer according to claim 1, the method comprising the steps of:
   (a) contacting the liquid medium which contains the nucleic acids and the proteins with the at least one depth filter layer;
   (b) retaining the nucleic acids upon the at least one depth filter layer; and
   (c) obtaining a filtrate containing the proteins and the liquid medium.

27. The method according to claim 26, wherein the method further comprises the step of
   (d) washing, after step (c), the depth filter layer with the liquid medium and/or with a rinsing medium in order to increase the content of the proteins in the filtrate.

28. The method according to claim 26, wherein the proteins are selected from the group of the antibodies, hormones, enzymes, peptides or mixtures thereof.

* * * * *